United States Patent [19]
Horn et al.

[11] Patent Number: 6,107,355
[45] Date of Patent: Aug. 22, 2000

[54] PRODUCTION OF POLYURETHANE FOAMS

[75] Inventors: Peter Horn, Heidelberg; Dieter Tintelnot, Diepholz, both of Germany

[73] Assignee: BASF Aktiengesellschaft, Ludwigshafen, Germany

[21] Appl. No.: 08/600,564

[22] Filed: Feb. 13, 1996

[30] Foreign Application Priority Data

Feb. 25, 1995 [DE] Germany ............................. 195 06 671

[51] Int. Cl.⁷ ....................................................... C08J 9/34
[52] U.S. Cl. ........................... 521/51; 521/121; 521/137; 521/170; 521/172; 521/174
[58] Field of Search .............................. 521/51, 121, 137, 521/170, 172, 174

[56] References Cited

U.S. PATENT DOCUMENTS

| | | | |
|---|---|---|---|
| 5,254,597 | 10/1993 | Horn et al. | 521/51 |
| 5,334,620 | 8/1994 | Horn et al. | 521/51 |
| 5,731,361 | 3/1998 | Horn et al. | 521/137 |

Primary Examiner—John M. Cooney, Jr.
Attorney, Agent, or Firm—Fernando A. Borrego

[57] ABSTRACT

In a process for producing polyurethane foams, preferably semirigid polyurethane foams and flexible, semirigid and rigid polyurethane integral foams,
a) at least one modified or unmodified organic polyisocyanate is reacted with
b) at least one relatively high molecular weight compound containing at least two reactive hydrogens and, if desired,
c) low molecular weight chain extenders and/or crosslinkers in the presence of
d) blowing agents, preferably water and/or (cyclo)alkanes,
e) a catalyst mixture comprising, according to the invention,
  e') from 35 to 65 parts by weight of di-n-octyltin bis(2-ethylhexyl thioglycolate) and
  e") from 65 to 35 parts by weight of mono-n-octyltin tris(2-ethylhexyl thioglycolate) and also, if desired,
  e'") cocatalysts selected from the group of tertiary amines, alkali metal and alkaline earth metal salts of monocarboxylic acids having from 1 to 20 carbon atoms and
f) if desired, additives,
with the reaction for forming the polyurethane integral foams being carried out in a closed mold with compaction at a degree of compaction of from 1.4 to 8.3.

13 Claims, No Drawings

PRODUCTION OF POLYURETHANE FOAMS

The invention relates to a process for producing polyurethane foams, hereinafter abbreviated to PU foams, preferably PU semirigid foams and flexible, semirigid and rigid PU integral foams, by reacting a) at least one modified or unmodified organic polyisocyanate with b) at least one relatively high molecular weight compound containing at least two reactive hydrogens and, if desired, c) low molecular weight chain extenders and/or crosslinkers in the presence of d) blowing agents, preferably water and/or (cyclo)alkanes, e) a catalyst mixture which according to the invention comprises e') from 35 to 65 parts by weight of di-n-octyltin bis(2-ethylhexyl thioglycolate) and e") from 65 to 35 parts by weight of mono-n-octyltin tris(2-ethylhexyl thioglycolate) and also, if desired, e'") cocatalysts, preferably selected from the group of tertiary amines, alkali metal and alkaline earth metal salts of monocarboxylic acids having from 1 to 20 carbon atoms and f) if desired, additives, where the reaction for forming the polyurethane integral foams is carried out in a closed mold with compaction, the degree of compaction being from 1.4 to 8.3.

The production of PU foams by reacting organic polyisocyanates with relatively high molecular weight polyhydroxyl compounds and, if desired, low molecular weight chain extenders and/or crosslinkers in the presence of catalysts and blowing agents and also, if desired, additives and auxiliaries is known and is described in numerous patent and literature publications. Examples which may be mentioned are the Kunststoff-Handbuch, Volume VII, Polyurethane, 1st Edition, 1966, edited by Dr. R. Vieweg and Dr. A. Höchtlen, Carl Hanser Verlag, Munich.

Also known is the production of PU semirigid foams by the prepolymer process, customarily on the basis of tolylene diisocyanate (TDI) prepolymers, and of semirigid and rigid PU foams by the one-shot process, advantageously using mixtures of diphenylmethane diisocyanates (MDI) and polyphenyl-polymethylene polyisocyanates, known as raw MDI, as polyisocyanates. Targeted selection of relatively high molecular weight polyhydroxyl compounds and chain extenders and/or crosslinkers and different amounts of polyisocyanates and water enable semirigid and rigid PU foams having different mechanical properties to be produced by these processes. Furthermore, PU semirigid foams can be produced without use of water by the frothing process with addition of dichlorodifluoromethane as blowing agent. As polyhydroxyl compounds, use is here made of a combination of branched, relatively high molecular weight polyoxyalkylene polyols and amine-initiated chain extenders having hydroxyl numbers in the range from 450 to 500. The polyaddition reaction can be activated by organic tin compounds (Kunststoff-Handbuch, Volume VII, Polyurethane, 2nd Edition, 1983, edited by D. G. Oertel, Carl Hanser Verlag, Munich, Vienna).

PU foams are advantageously produced with addition of tertiary amines as catalysts, since these accelerate both the reaction between the hydroxyl groups of the polyhydroxyl compounds and the NCO groups of the polyisocyanates, the urethane formation, and also the reaction between water and NCO groups to form amino groups and carbon dioxide as blowing gas, the blowing reaction, where, particularly in the one-shot process, the rates of the simultaneous reactions have to be matched exactly to one another. Since, in foam formation, not only the polyaddition and blowing reactions, but also crosslinking reactions to form allophanate, urea, biuret and cyanurate structures can occur, the catalysts used have to ensure a synchronous course of these various reactions. The catalysts must neither lose their catalytic activity as a result of premature incorporation into the polyurethane framework, nor accelerate the hydrolytic decomposition of the PU foam produced.

A disadvantage is the unpleasant odor of many of the tertiary amines used in practice as catalyst, which odor can be carried over into the PU foams produced and adversely affect their use for certain applications. According to DE-A-23 21 884 (GB-A-1 344 038), polyether polyols prepared using a tertiary amine as catalyst are therefore used in combination with an acid and a silicone oil for producing PU foams.

The production of moldings containing urethane groups and having a cellular core and a compacted surface zone together with an essentially pore-free surface, known as PU integral foams, by reacting the abovementioned formative components in the presence of blowing agents, preferably physically active blowing agents, catalysts and, if desired, additives in a closed, heated or unheated mold is likewise not new and is described, for example, in DE-A-16 94 138 (GB 1 209 243), DE-C-19 55 891 (GB 1 321 679) and DE-B-17 69 886 (U.S. Pat. No. 3,824,199).

A summary overview of such moldings of PU integral foams has been published, for example, in Kunststoff-Handbuch, Volume 7, Polyurethane, edited by Dr. G. Oertel, Carl-Hanser-Verlag, Munich, Vienna, 2nd Edition, 1983, pages 333ff. and in Integralschaumstoffe by Dr. H. Piechota and Dr. H. Röhr, Carl-Hanser-Verlag, Munich, Vienna, 1975.

Although the production of PU integral foam moldings has achieved extraordinary industrial importance, the processes described have, owing to increased environmental consciousness, deficiencies in respect of the blowing agents used. As blowing agents, chlorofluorocarbons, preferably trichlorofluoromethane, are used worldwide on a large scale. Under the action of the exothermic polyaddition reaction, these chlorofluorocarbons first evaporate, then partially condense under increased pressure on the cooler inner wall of the mold and are incorporated into the moldings. The disadvantage of these blowing gases is only environmental pollution, since they are suspected of participating in the degradation of the ozone layer in the stratosphere.

To reduce the amounts of chlorofluorocarbons, water is predominantly used as the blowing agent. The water reacts with the polyisocyanate with evolution of carbon dioxide which acts as the actual blowing gas. A disadvantage of this process is that the carbon dioxide formed is not condensed on the inner surface of the mold under the reaction conditions prevailing in the mold and can thus lead to formation of moldings having a porous surface.

As already indicated, PU foams and PU integral foams are advantageously produced in the presence of tertiary amines as catalysts. However, suitable catalysts also include organometallic compounds. DE-A-26 57 413 (U.S. Pat. No. 4,101,471) describes, for example, the use of organotin compounds of the formula $R^1{}_2Sn(S-CH_2COO-isooctyl)_2$, where $R^1$ is a methyl, butyl or octyl group, as addition or gel catalyst in combination with tertiary amines as blowing catalyst for producing water-foamed, highly elastic PU foams. According to DE-A-26 13 919 (GB-A-1 556 047), flexible PU foams can be produced using gel catalysts of the formula $R^1{}_aSnX_{4-a}$, where $R^1$ is a methyl, allyl, phenyl, substituted phenyl or benzyl group, X is, inter alia, —SCH$_2$COOR$^3$, R$^3$ is an alkyl, cycloalkyl, phenylalkyl, alkylphenyl or phenyl group and a is one of the integers 1, 2 or 3. DE-A-26 41 734 (U.S. Pat. No. 4,173,692) describes two-component catalyst compositions for producing rigid polyisocyanurate foams modified with urethane groups, these catalysts comprising an alkali metal salt and an organotin compound of the formula R$^1{}_a$SnX$_{4-a}$, where R$^1$, X and a are as defined above. An example mentioned is, inter alia, a catalyst combination comprising potassium 2-ethylhexanoate and di(n-octyl)tin bis(isooctyl thioglycolate). According to EP-A-0 545 175 (U.S. Pat. No. 5,334,620), CFC-free PU integral foam moldings can likewise be produced using strongly basic amines and/or organic metal compounds as catalysts. Among numerous suitable catalysts or combinations, a mixture comprising 94% by weight of di-n-octyltin bis(2-ethylhexyl thioglycolate) and 6% by weight of mono-n-octyltin tris(2-ethylhexyl thioglycolate) is said to be extremely advantageous. DD-A-255 535 describes a process for preparing storage-stable, catalyst-containing hydroxyl prepolymers which are suitable for further processing to give elastic polyurethanes such as, for example, coating compositions, casting compositions, adhesives and elastic motor vehicle fittings such as seals and shock absorbers. According to this patent, catalysts can be incorporated into the prepared hydroxyl prepolymers before their further processing, with examples described being, inter alia, a molar 1:1 mixture of dioctyltin bis(2-ethylhexyl thioglycolate) and octyltin tris(2-ethylhexyl thioglycolate). However, DD-A-255 535 gives no information regarding the use of the catalyst-containing hydroxyl prepolymers for producing PU foams or PU integral foams.

Despite the tremendous number of literature and patent publications on the production of PU foams and PU integral foams and the catalysts able to be used for this purpose, the processes have disadvantages since the mechanical properties of the known PU foams often no longer meet the present-day technical requirements. Thus, in PU integral foams, particularly if demolding times are short, detachment of the essentially compact surface zone from the cellular foam core occurs. Another problem is frequently the inadequate flow behavior of the foamable reaction mixtures, which is a drawback particularly in the filling of molds having complicated shapes. Since the PU semirigid foams are nowadays foamed virtually exclusively with water as blowing agent, hydrolysis-stable organometallic compounds are necessary as catalysts for producing storage-stable polyol components (A).

It is an object of the present invention to provide suitable catalysts for producing PU foams and PU integral foams, which catalysts are hydrolysis-stable and therefore give storage-stable polyol components (A). The reaction mixtures for producing the PU (integral) foams should flow readily and quickly run through long flow paths. The mold-foamed PU foams should be able to be quickly demolded so as to make possible low-cost, short demolding times. The catalysts should have virtually no migration tendency, preferably none at all, to enable the formation of low-fogging PU foams.

We have found that this object is achieved by means of a hydrolysis-stable catalyst combination of n-octyltin 2-ethylhexyl thioglycolates.

The invention accordingly provides a process for producing PU foams, preferably PU semirigid foams, by reacting
a) organic polyisocyanates, modified organic polyisocyanates or mixtures of organic and modified organic polyisocyanates with
b) at least one relatively high molecular weight compound containing at least two reactive hydrogens and, if desired,
c) low molecular weight chain extenders, crosslinkers or mixtures of chain extenders and crosslinkers
in the presence of
d) blowing agents,
e) catalysts
and in the presence or absence of
f) additives,
wherein the catalysts (e) used are a mixture comprising
e') from 35 to 65 parts by weight of di-n-octyltin bis(2-ethylhexyl thioglycolate) and
e'') from 65 to 35 parts by weight of mono-n-octyltin tris(2-ethylhexyl thioglycolate).

The invention also provides a process for producing PU integral foams by reacting
a) organic polyisocyanates, modified organic polyisocyanates or mixtures of organic and modified organic polyisocyanates with
b) at least one relatively high molecular weight compound containing at least two reactive hydrogens and, if desired,
c) low molecular weight chain extenders, crosslinkers or mixtures of chain extenders and crosslinkers
in the presence of
d) blowing agents,
e) catalysts
and in the presence or absence of
f) additives,
in a closed mold with compaction, wherein the catalysts (e) used are a mixture comprising
e') from 35 to 65 parts by weight of di-n-octyltin bis(2-ethylhexyl thioglycolate) and
e'') from 65 to 35 parts by weight of mono-n-octyltin tris(2-ethylhexyl thioglycolate).

The use according to the invention of the hydrolysis-stable catalyst combination enables water-containing polyol components (A) having an essentially unlimited storage life to be obtained. The specific catalyst combination effects an advantageous prolonging of the initiation time of the foamable reaction mixture, which results in improved flowability and lengthening of its flow paths. Since the catalyst combination causes a sudden setting of the reaction mixture, the difference between prolonged initiation time and setting time can be reduced and, as a function of the amount of catalyst used, the flow path and the demolding time can be controlled exactly. This measure enables, in the production of PU integral foams, the formation of the essentially compact surface zone to be matched in a targeted manner to the desired mechanical requirements, without favoring its undesired detachment from the foam core. In the production of the PU foams, preferably the PU semirigid foams and in particular PU foam moldings, the use according to the invention of the catalyst combination enables the foam density and thus the weight of the molding, for example for dashboards, to be reduced. Since the PU foams formed have a higher closed cell content, for example more than 5%, the effect of the blowing gas is exploited better or the gas yield is increased.

To produce the PU foams, preferably PU semirigid foams and flexible, semirigid and rigid PU integral foams, the catalyst combination of the invention can be processed together with the starting materials known per se, about which the following may be said:

a) Suitable organic polyisocyanates (a) are aliphatic, cycloaliphatic and preferably aromatic polyvalent isocyanates.

Specific examples are: alkylene diisocyanates having from 4 to 12 carbon atoms in the alkylene radical, such as 1,12-dodecane diisocyanate, 2-ethyltetramethylene 1,4- diisocyanate, 2-methylpentamethylene 1,5-diisocyanate, 2-butyl-2-ethylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, araliphatic diisocyanates, such as, for example, xylylene 1,4-diisocyanate and xylylene diisocyanate isomer mixtures and preferably aromatic diisocyanates and polyisocyanates such as, for example, tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'- and, if desired, 2,2'-diisocyanates, polyphenyl-polymethylene polyisocanates, mixtures of diphenylmethane 4,4'-, 2,4'- and 2,2'-diisocyanates and polyphenyl-polymethylene polyisocyanates (raw MDI) and mixtures of raw MDI and tolylene diisocyanates. The organic diisocyanates and polyisocyanates can be used either individually or in the form of mixtures.

The organic polyisocyanates can be prepared by known methods. They are preferably prepared by reaction of the corresponding polyamines with phosgene to form polycarbamyl chlorides and their thermal dissociation at elevated temperatures into the organic polyisocyanate and hydrogen chloride or by phosgene-free processes, for example by reacting the corresponding polyamines with urea and alcohol to give polycarbamyl esters and their thermal dissociation at elevated temperatures into the polyisocyanate and alcohol.

Use is also frequently made of modified polyvalent isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples are: organic, preferably aromatic polyisocyanates containing urethane groups and having NCO contents of from 33.6 to 15% by weight, preferably from 31 to 21% by weight, based on the total weight, for example diphenylmethane 2,4'- and/or 4,4'-diisocyanate or tolylene 2,4- and/or 2,6-diisocyanate modified with low molecular weight diols, triols, dialkylene glycols, trialkylene glycols, polyoxyalkylene glycols or trifunctional and higher-functional polyoxyalkylene polyols having molecular weights of up to 4200, with examples of dialkylene or polyoxyalkylene glycols or polyols, which can be used individually or as mixtures, being: diethyene, dipropylene, polyoxyethylene, polyoxypropylene and polyoxypropylene-polyoxyethylene glycols. Other suitable polyisocyanates are NCO-containing prepolymers having NCO contents of from 25 to 3.5% by weight, preferably from 21 to 14% by weight, based on the total weight, prepared from the polyester and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other polyisocyanates which have been found to be useful are liquid polyisocyanates containing carbodiimide groups and/or isocyanurate rings and having NCO contents of from 33.6 to 15% by weight, preferably from 31 to 21% by weight, based on the total weight, for example those based on diphenylmethane 4,4'-, 2,4'- and/or 2,2'-diisocyanate and/or tolylene 2,4- and/or 2,6-diisocyanate.

The modified polyisocyanates can, if desired, be mixed with one another or with unmodified organic polyisocyanates such as, for example, diphenylmethane 2,4'-, 4,4'-diisocyanate, raw MDI, tolylene 2,4- and 2,6-diisocyanate. Examples of mixtures which have been found to be very useful are those of diphenylmethane diisocyanates modified with urethane groups and tolylene diisocyanates and/or raw MDI.

Organic polyisocyanates which have been found to be particularly useful and are therefore preferably used for producing the flexible or semirigid PU foams and PU integral foam moldings are: NCO-containing prepolymers having an NCO content of from 25 to 9% by weight, in particular those based on polyether or polyester polyols and one or more diphenylmethane diisocyanate isomers, advantageously diphenylmethane 4,4'-diisocyanate and/or modified organic polyisocyanates containing urethane groups and having an NCO-content of from 33.6 to 15% by weight, in particular those based on diphenylmethane 4,4'-diisocyanate or diphenylmethane diisocyanate isomer mixtures, mixtures of tolylene 2,4- and 2,6-diisocyanates, mixtures of tolylene diisocyanates and raw MDI or, in particular, mixtures of the abovementioned prepolymers based on diphenylmethane diisocyanate isomers and raw MDI. The aromatic polyisocyanates, modified aromatic polyisocyanates or polyisocyanate mixtures advantageously have an average functionality of from 2 to 2.6 and preferably from 2 to 2.4. The rigid PU foams and PU integral foam moldings are preferably produced using aromatic polyisocyanates modified with urethane groups and having a functionality of greater than 2.6, advantageously from 2.8 to 3.5, and in particular raw MDI.

If moldings having a light-stable surface are required for specific applications, for example for interior trim of vehicles, they are preferably produced using aliphatic or cycloaliphatic polyisocyanates, in particular modified polyisocyanates based on hexamethylene 1,6-diisocyanate or isophorone diisocyanate or mixtures of the specified diisocyanates, if desired together with diphenylmethane diisocyanate and/or tolylene diisocyanate isomers.

b) As relatively high molecular weight compounds (b) containing at least two reactive hydrogens, use is advantageously made of those having a functionality of from 2 to 8 and a molecular weight of from 400 to 8500, with the relatively high molecular weight compounds (b) having a functionality of preferably from 2 to 3 and in particular from 2.0 to 2.6 and a molecular weight of preferably from 1800 to 6000 and in particular from 2000 to 5000 being used for producing flexible and semirigid PU foams or PU integral foam moldings and those having a functionality of preferably from 3 to 8 and in particular from 3 to 6 and a molecular weight of preferably from 400 to 3200, in particular from 600 to 2400, being used for producing rigid PU foams and PU integral foam moldings. Compounds (b) which have been found to be particularly useful are polyhydroxyl compounds having the abovementioned functionalities and molecular weights and selected from the group of polyether polyols, polyester polyols, polythioether polyols, hydroxyl-containing polyesteramides, hydroxyl-containing polyacetals, hydroxyl-containing aliphatic polycarbonates and polymer-modified polyether polyols or mixtures of at least two of the specified polyhydroxyl compounds. Preference is given to using polyester polyols and/or, in particular, polyether polyols.

The molecular weights specified were calculated according to the formula $$\text{Molecular weight} = \frac{56100 \times \text{functionality}}{\text{Hydroxyl number}}$$

where the hydroxyl number was experimentally determined in a known manner.

Other relatively high molecular weight compounds (b) which can be used are polyoxyalkylene-polyamines, advantageously polyoxyalkylenediamines and/or polyoxyalkylenetriamines having the abovementioned molecular weights or mixtures of such polyoxyalkylene-polyamines and polyhydroxyl compounds, preferably polyether polyols.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Suitable dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives, for example dicarboxylic monoesters and/or diesters of alcohols having from 1 to 4 carbon atoms or dicarboxylic anhydrides. Preference is given to using dicarboxylic acid mixtures of succinic, glutaric and adipic acid in weight ratios of, for example, 20 to 35:35 to 50:20 to 32, and in particular adipic acid. Examples of dihydric and higher-functional alcohols, in particular alkanediols and alkylene glycols are: ethanediol, diethylene glycol, 1,2- or 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol, glycerol or mixtures of at least two of the diols specified, in particular mixtures of 1,4-butanediol, 1,5-pentanediol and 1,6-hexanediol and/or glycerol. It is also possible to use polyester polyols from lactones, eg. ε-caprolactone, or hydroxycarboxylic acids, eg. ω-hydroxycaproic acid.

To prepare the polyester polyols, the organic, for example aromatic and preferably aliphatic, polycarboxylic acids and/or derivatives can be polycondensed with polyhydric alcohols, either in the absence of catalysts or preferably in the presence of esterification catalysts, advantageously in an atmosphere of inert gases such as nitrogen, carbon monoxide, helium, argon, etc., in the melt at from 150 to 250° C., preferably 180 to 220° C., at atmospheric pressure or under reduced pressure, to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene, to azeotropically distil off the water of condensation.

To prepare the polyester polyols, the organic polycarboxylic acids and/or derivatives are polycondensed with polyhydric alcohols in a molar ratio of advantageously 1:1 to 1.8, preferably 1:1.05 to 1.2. To remove cyclic, volatile byproducts, the polyester polyols can subsequently be subjected to an additional distillation under reduced pressure, eg. by means of a thin-film evaporator.

The polyester polyols obtained preferably have a functionality of from 2 to 3, in particular from 2 to 2.6, and a molecular weight of from 1200 to 3600, preferably from 1500 to 3000 and in particular from 1800 to 2500.

However, polyhydroxyl compounds used are, in particular, polyether polyols which are prepared by known methods, for example by anionic polymerization using alkali metal hydroxides, for example sodium or potassium hydroxide, or alkali metal alkoxides, for example sodium methoxide, sodium or potassium ethoxide or potassium isopropoxide, as catalysts with addition of at least one initiator molecule containing in bonded form from 2 to 8, preferably 2 or 3, reactive hydrogens for polyether polyols for producing flexible and semirigid PU foams and PU integral foam moldings and preferably from 3 to 8, in particular from 3 to 6, reactive hydrogens for polyether polyols for producing rigid PU foams and PU integral foam moldings, or by cationic polymerization using Lewis acids, for example antimony pentachloride, boron fluoride etherate, etc., or bleaching earth as catalysts, from one or more alkaline oxides having from 2 to 4 carbon atoms in the alkylene radical.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, in succession or as mixtures. Suitable initiator molecules are, for example: water, organic dicarboxylic acids such as succinic acid, adipic acid, phthalic acid and terephthalic acid, aliphatic and aromatic, unsubstituted or N-monoalkylated or N,N- or N,N'-dialkylated diamines having from 1 to 4 carbon atoms in the alkyl radical, for example unsubstituted, monoalkylated or dialkylated ethylenediamine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Further suitable initiator molecules are: alkanolamines such as ethanolamine, N-alkylalkanolamines, for example N-methylethanolamine and N-ethylethanolamine, dialkanolamines such as diethanolamine, N-alkyldialkanolamines, for example N-methyldiethanolamine and N-ethyldiethanolamine, trialkanolamines such as triethanolamine and ammonia. Preference is given to using polyhydric, in particular dihydric or trihydric, alcohols and/or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or mixtures of at least two polyhydric alcohols and, if desired, additionally water.

The polyether polyols, preferably polyoxypropylene and polyoxypropylene-polyoxyethylene polyols, possess, as already mentioned, a functionality of from 2 to 8 and molecular weights of from 400 to 8500, and suitable polyoxytetramethylene glycols have a molecular weight of up to about 4000, preferably from 600 to 2200.

Other suitable polyether polyols are polymer-modified polyether polyols, preferably grafted polyether polyols, in particular those based on styrene and/or acrylonitrile prepared by in situ polymerization of acrylonitrile, styrene or preferably mixtures of styrene and acrylonitrile, for example in a weight ratio of from 90:10 to 10:90, preferably from 70:30 to 30:70, in, advantageously, the abovementioned polyether polyols using methods similar to those described in the German Patents 11 11 394, 12 22 669 (U.S. Pat. Nos. 3,304,273, 3,383,351, 3,523,093), 11 52 536 (GB-A-10 40 452) and 11 52 537 (GB-A-987 618), and also polyether polyol dispersions containing as dispersed phase, usually in an amount of from 1 to 50% by weight, preferably from 2 to 25% by weight, for example polyurea, polyhydrazides, polyurethanes containing bonded tert-amino groups and/or melamine and which are described, for example, in EP-B-011 752 (U.S. Pat. No. 4,304,708), U.S. Pat. No. 4,374,209 and DE-A-32 31 497.

Like the polyester polyols, the polyether polyols can be used either individually or in the form of mixtures, with preference being given to mixtures of difunctional and at least trifunctional polyether polyols or polyester polyols. Furthermore, they can be mixed with the polymer-modified polyether polyols or polyester polyols or the hydroxyl-containing polyesteramides, polyacetals, polycarbonates and/or polyoxyalkylene-polyamines.

Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Polymerization of cyclic acetals also enables suitable polyacetals to be prepared.

Suitable hydroxyl-containing polycarbonates are those of a type known per se which can be prepared, for example, by reacting diols such as 1,3-propanediol, 1,4-butanediol and/or 1,6-hexanediol, diethylene glycol, trioxyethylene glycol or tetraoxyethylene glycol with diaryl carbonates, eg. diphenyl carbonate, or phosgene.

The hydroxyl-containing polyesteramides include, for example, the predominantly linear condensates obtained from polybasic, saturated and/or unsaturated carboxylic acids or the anhydrides and polyhydric, saturated and/or unsaturated amino alcohols or mixtures of polyhydric alcohols and amino alcohols and/or polyamines.

Suitable polyether-polyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE-A-12 15 373).

c) The PU foams, preferably semirigid PU foams, and the flexible, semirigid or rigid moldings containing urethane groups and having a compacted surface zone and a cellular core, the PU integral foams, can be produced with or without use of chain extenders and/or crosslinkers (c). However, in the case of flexible and semirigid PU foams and PU integral foams, the addition of chain extenders, crosslinkers or, if desired, mixtures thereof has been found to be advantageous for modifying the mechanical properties, eg. the hardness. Chain extenders and/or crosslinkers which can be used are, for example, low molecular weight, polyhydric alcohols, preferably diols and/or triols, having molecular weights of less than 400, preferably from 60 to 300. Suitable chain extenders are, for example, aliphatic, cycloaliphatic and/or araliphatic diols, for example alkanediols and/or dialkylene glycols, having from 2 to 14, preferably from 4 to 10, carbon atoms, for example ethylene glycol, 1,3-propanediol, 1,10-decanediol, o-, m-, p-dihydroxycyclohexane, diethylene glycol, triethylene glycol, dipropylene glycol, tripropylene glycol and preferably 1,3-butanediol, 1,4-butanediol, 1,6-hexanediol and bis(2-hydroxyethyl)hydroquinone, and suitable crosslinkers are, for example, triols such as 1,2,4- and 1,3,5-trihydroxycyclohexane, trimethylolethane, glycerol and trimethylolpropane and tetrahydric to octahydric alcohols such as pentaerythritol, sorbitol and sucrose, and also low molecular weight hydroxyl-containing polyalkylene oxides, for example those having molecular weights of up to 400, based on ethylene and/or 1,2-propylene oxide and the initiator molecules mentioned above for the preparation of polyether polyols.

Other suitable chain extenders are N,N'-dialkylated aromatic diamines whose aromatic radical may be unsubstituted or substituted by alkyl groups and which have from 1 to 20, preferably from 1 to 4, carbon atoms in the N-alkyl radical, for example N,N'-diethyl-, N,N'-di-sec-pentyl-, N,N'-di-sec-hexyl-, N,N'-dicyclohexyl-p- or -m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

Further suitable chain extenders or crosslinkers are polyoxyalkylene polyols having a functionality of from 2 to 4 and a molecular weight of up to 400, which are prepared by polyaddition of ethylene oxide, 1,2-propylene oxide or mixtures of ethylene oxide and 1,2-propylene oxide to at least one initiator molecule of the formula

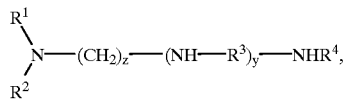

where
$R^1$ and $R^2$ are identical or different, linear or branched $C_1$- to $C_4$-alkyl radicals,
both radicals together are a $C_4$- to $C_6$-cycloalkylene radical, which can contain an —O— or —NR$^5$— bridge in place of a methylene group, where $R^5$ is a $C_1$- to $C_4$-alkyl radical, or
identical or different dialkylaminoalkyl radicals of the formula

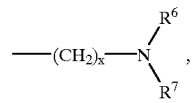

where
$R^6$ and $R^7$ are identical or different, linear or branched $C_1$- to $C_4$-alkyl radicals or both radicals together are a $C_4$- to $C_6$-cycloalkylene radical, which can contain an —O— or —NR$^5$— bridge in bonded form in place of a methylene group, and x is an integer of at least 3,
z is an integer of at least 3,
$R^3$ is a $C_2$- to $C_4$-alkylene group,
y is zero or a number from 1 to 3 and
$R^4$ is hydrogen or a $C_1$- to $C_4$-alkyl radical, with the proviso that if y is equal to zero, $R^4$ is hydrogen.

Examples of initiator molecules of this type are N,N-dimethyl-1,3-diaminopropane, N,N-dimethyl-1,4-diaminobutane, N,N-dimethyldipropylenetriamine and N,N-di-tert-butyl-1,3-diaminopropane.

If the compounds of the component (c) are used, these can be used in the form of mixtures or individually and are advantageously used in amounts of from 1 to 50 parts by weight, preferably from 3 to 40 parts by weight, based on 100 parts by weight of the relatively high molecular weight compounds (b).

The rigid PU foams and PU integral foams are usually produced without use of chain extenders and/or crosslinkers.

d) The blowing agent (d) used is preferably water, which reacts with the organic, modified or unmodified polyisocyanates (a) to form carbon dioxide and amino groups which in turn react further with polyisocyanates (a) to give urea groups and can thereby influence the compressive strength of the PU foams and PU integral foam moldings. Since the formative components (b) and, if applicable, (c) and additives (f) can contain water because of their preparation and/or chemical composition, it is in some cases not necessary to separately add water to the formative components (b) and, if applicable, (c) or the reaction mixture. However, if water has to be additionally incorporated into the polyurethane formulation to achieve the desired bulk density, this is usually used in amounts of from 0.05 to 4.0% by weight, preferably from 0.1 to 3.0% by weight and in particular from 0.3 to 2.5% by weight, based on the weight of the formative components (a) to (c).

As blowing agent (d), it is also possible to use, in place of water or preferably in combination with water, low-boiling liquids which vaporize during the exothermic polyaddition reaction and advantageously have a boiling point at atmospheric pressure in the range from −40 to 120° C., preferably from 10 to 90° C., or gases.

The liquids of the abovementioned type and gases suitable as blowing agent can, for example, be selected from the group of alkanes such as propane, n- and iso-butane, n- and iso-pentane and preferably the industrial pentane mixtures, cycloalkanes and cycloalkenes such as cyclobutane, cyclopentene, cyclohexene and preferably cyclopentane and/or cyclohexane, dialkyl ethers such as dimethyl ether, methyl ethyl ether or diethyl ether, tert-butyl methyl ether, cycloalkylene ethers such as furan, ketones such as acetone, methyl ethyl ketone, acetals and/or ketals such as formaldehyde dimethyl acetal, 1,3-dioxolane and acetone dimethyl acetal, carboxylic esters such as ethyl acetate, methyl formate and tert-butyl ester of ethyleneacrylic acid, tertiary alcohols such as tertiary butanol, carboxylic acids such as formic acid, acetic acid and propionic acid, fluoroalkanes which are degraded in the troposphere and therefore do not damage the ozone layer, for example trifluoromethane, difluoromethane, difluoroethane, tetrafluoroethane and heptafluoroethane, chloroalkanes such as 2-chloropropane, and gases such as nitrogen, carbon monoxide and noble gases such as helium, neon and krypton.

Of the liquids which are inert towards NCO groups and are suitable as blowing agents (d), preference is given to using alkanes, cycloalkanes or mixtures of alkanes and cycloalkanes having a boiling point of from −40 to 50° C. at atmospheric pressure.

Further suitable blowing agents are salts which decompose thermally, for example ammonium bicarbonate and/or ammonium carbamate, or compounds which form such salts in situ, for example aqueous ammonia and/or amines and carbon dioxide, and ammonium salts of organic carboxylic acids such as the monoammonium salts of malonic acid, boric acid, formic acid or acetic acid.

The most advantageous amount of solid blowing agent, low-boiling liquids and gases, which can each be used individually or in the form of mixtures, for example as liquid or gas mixtures or as gas-liquid mixtures, depends on the desired density and on the amount of water used. The amounts required can easily be determined by simple tests. Satisfactory results are usually given by from 0.5 to 35 parts by weight, preferably from 2 to 15 parts by weight, of solids, from 1 to 30 parts by weight, preferably from 3 to 18 parts by weight, of liquid and/or from 0.01 to 80 parts by weight, preferably from 10 to 35 parts by weight, of gas, in each case based on the weight of the formative components (a), (b) and, if applicable, (c). The introduction of gas, for example air, carbon dioxide, nitrogen and/or helium, can be carried out either via the relatively high molecular weight compounds (b) and, if applicable, low molecular weight chain extenders and/or crosslinkers (c) or via the polyisocyanates (a) or via (a) and (b) and, if applicable, (c).

Blowing agents which are not used are, as already indicated, fully halogenated chlorofluorocarbons.

e) The catalyst (e) used according to the invention for producing the PU foams and PU integral foams is a catalyst mixture comprising e') from 35 to 65 parts by weight, preferably from 40 to 60 parts by weight and in particular from 45 to 55 parts by weight, of di-n-octyltin bis(2-ethylhexyl thioglycolate) and e") from 65 to 35 parts by weight, preferably from 60 to 40 parts by weight and in particular from 55 to 45 parts by weight, of mono-n-octyltin tris(2-ethylhexyl thioglycolate).

Particular preference is given to mixtures of (e') and (e") in a weight ratio of about 1:1.

To produce the PU foams and PU integral foams, the catalyst mixtures (e), comprising (e') and (e"), are advantageously used in an amount of from 0.005 to 1% by weight, preferably from 0.01 to 0.5% by weight and in particular from 0.03 to 0.2% by weight, based on the weight of the formative components (a), (b) or (b) and (c).

The catalyst mixtures (e) comprising (e') and (e") which can be used according to the invention can also be used in combination with cocatalysts. Cocatalysts which have been found to be very useful and are therefore preferably used are tertiary amines and alkali metal or alkaline earth metal salts of monocarboxylic acids having from 1 to 20, preferably from 1 to 12, carbon atoms or mixtures of tertiary amines and the alkali metal and/or alkaline earth metal salts mentioned. In place of the tertiary amines or in admixture with these, it is also possible to use other strongly basic amines such as amidines and/or alkanolamines as cocatalysts. Examples of suitable cocatalysts which may be mentioned are: tertiary amines such as triethylamine, tributylamine, dimethylbenzylamine, N-methylmorpholine, N-ethylmorpholine, N-cyclohexylmorpholine, N,N,N'N'-tetramethylethylenediamine, N,N,N',N'-tetramethylbutanediamine, N,N,N',N'-tetramethyldiaminodicyclohexylmethane, pentamethyldiethylenetriamine, bis(dimethylaminoethyl) ether, bis(dimethylaminopropyl)urea, dimethylpiperazine, 1,2-dimethylimidazole, 1-azabicyclo-[3,3,0]octane and preferably 1,4-diazabicyclo[2,2,2]octane, alkali metal or alkaline earth metal salts such as potassium formate, potassium acetate and potassium octanoate, alkali metal salts of fatty acids having from 10 to 20 carbon atoms and, if desired, lateral OH groups, for example potassium stearate, amidines such as 2,3-dimethyl-3,4,5,6-tetrahydropyrimidine, tris(dialkylaminoalkyl)-s-hexahydrotriazines such as tris(N,N-dimethylaminopropyl)-s-hexahydrotriazine and alkanolamines such as triethanolamine, triisopropanolamine, N-methyldiethanolamine and N-ethyldiethanolamine and N,N-dimethylethanolamine. If the cocatalysts are used in combination with the catalyst mixture (e) comprising (e')

and (e″) which can be used according to the invention, these are used, depending on the amount of catalyst mixture (e), in an amount of from 0 to 3% by weight, preferably from 0.03 to 0.5% by weight and in particular from 0.05 to 0.2% by weight, based on the weight of (b) or (b) and (c). The optimum amount of catalyst mixture (e) or catalyst(s) can be experimentally determined in a simple manner as a function of the formative components (a), (b), (d) and, if applicable, (c) and (f) present in the reaction mixture and also the geometry of the mold.

f) The PU foams and PU integral foams can be produced with or without addition of additives (f). Examples of suitable additives (f) are microporous activated carbon and/or microporous carbon molecular sieves as described in U.S. Pat. No. 5,254,597, crystalline, microporous molecular sieves and/or crystalline silicon oxide as described in U.S. Pat. No. 5,110,834, amorphous microporous silica gels as described in EP-A-0 513 573, concentrates of polyhydroxyl compounds and ammonium bicarbonate and/or salts of amines and carbon dioxide for producing the PU integral foams, and surface-active substances, foam stabilizers, cell regulators, lubricants, release agents, fillers, dyes, pigments, flame retardants, hydrolysis inhibitors, fungistatic and bacteriostatic substances or mixtures thereof for producing the PU foams and PU integral foams.

Suitable surface-active substances are, for example, compounds which serve to assist the homogenization of the starting materials and may also be suitable for regulating the cell structure. Examples which may be mentioned are emulsifiers such as the sodium salts of castor oil sulfates or of fatty acids and also salts of fatty acids with amines, eg. diethylamine oleate, diethanolamine stearate, diethanolamine ricinoleate, salts of sulfonic acids, eg. alkali metal or ammonium salts of dodecylbenzenedisulfonic acid or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, esters of castor oil or ricinoleic acid, Turkey red oil and peanut oil; and cell regulators such as paraffins, fatty alcohols and dimethylpolysiloxanes. Oligomeric polyacrylates having polyoxyalkylene and fluoroalkane radicals as side groups are also suitable for improving the emulsifying action, the cell structure and/or stabilizing the foam. The surface-active substances are usually used in amounts of from 0.01 to 5 parts by weight, based on 100 parts by weight of the component (b).

As lubricant, the addition of, for example, a ricinoleic acid polyester having a molecular weight of from 1500 to 3500, preferably from 2000 to 3000, has been found to be very useful, this being advantageously used in an amount of from 0.5 to 10% by weight, preferably from 5 to 8% by weight, based on the weight of the component (b) or the components (b) and (c).

For the purposes of the present invention, fillers, in particular reinforcing fillers, are the customary organic and inorganic fillers and reinforcements known per se. Specific examples are: inorganic fillers such as siliceous minerals, for example sheet silicates such as antigorite, serpentine, hornblendes, amphiboles, chrysotile, talc, wollastonite, mica and synthetic silicates such as magnesium aluminum silicate (Transpafill®); metal oxides such as kaolin, aluminum oxides, aluminum silicates, titanium oxides and iron oxides, metal salts such as chalk, barite and inorganic pigments such as cadmium sulfide and zinc sulfide. Examples of suitable organic fillers are: carbon black, melamine, rosin, cyclopentadienyl resins and graft polymers.

Fillers and/or reinforcements which have been found to be very useful and are therefore preferably used are: glass spheres, short glass fibers, glass mats, nonwovens of glass or synthetic fibers, continuous fibers of glass or synthetic polymers such as polyesters, polyamides, thermoplastic polyurethanes and aramid, metal fibers and natural fibers such as cellulose, reed and sisal. The continuous fibers can also be used in short, cut form. The fillers and reinforcements can be used either individually or in suitable combinations among one another or with one another.

The inorganic and organic fillers and/or reinforcements can be incorporated into the reaction mixture, and, if they are used at all, are advantageously used in an amount of from 0.5 to 50% by weight, preferably from 1 to 40% by weight, based on the weight of the components (a) to (c). Mats and nonwovens of fibers can be laid in the same amounts into the empty mold.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

Apart from the halogen-substituted phosphates mentioned above, it is also possible to use inorganic flame retardants such as modified or unmodified red phosphorus, expanded graphite, hydrated aluminum oxide, antimony trioxide, arsenic oxide, ammonium polyphosphate and calcium sulfate, or cyanuric acid derivatives such as melamine or mixtures of at least two flame retardants, for example expanded graphite and ammonium polyphosphate, ammonium polyphosphates and melamine, or, if desired, expanded graphite and/or starch for making the moldings produced according to the invention flame resistant. In general, it has been found to be advantageous to use from 2 to 50 parts by weight, preferably from 5 to 25 parts by weight, of the specified flame retardants or mixtures per 100 parts by weight of the components (a) to (c).

Further details about the abovementioned other customary auxiliaries and additives can be found in the specialist literature, for example in the monograph by J. H. Saunders and K. C. Frisch "High Polymers", Volume XVI, Polyurethanes, part 1 and 2, Interscience Publishers 1962 or 1964, or the Kunststoff-Handbuch, Polyurethane, Volume VII, Carl-Hanser-Verlag, Munich, Vienna, 1st and 2nd Editions, 1966 and 1983.

To produce the PU foams and PU integral foam moldings, the organic, modified or unmodified polyisocyanates (a), relatively high molecular weight compounds containing at least two reactive hydrogens (b) and, if desired, low molecular weight chain extenders and/or crosslinkers are usually reacted in such amounts that the equivalence ratio of NCO groups of the polyisocyanates (a) to the total of reactive hydrogens in the components (b) and, if applicable, (c) is from 0.85 to 1.50:1, preferably from 0.95 to 1.15:1 and in particular from 0.9 to 1.1:1.

The PU integral foam moldings can be produced by the prepolymer process or preferably by the one-shot process by means of the low-pressure technique or the high-pressure technique in closed, advantageously heatable molds, for example metal molds, eg. of aluminum, cast iron or steel, or molds of fiber-reinforced polyester or epoxide molding compositions. However, owing to the good flowability and improved processability of the formulations, the moldings are particularly preferably produced by means of the reaction injection molding technique (RIM technique). These process methods are described, for example, by Piechota and Röhr in "Integralschaumstoff", Carl-Hanser-Verlag, Munich, Vienna 1975; D. J. Prepelka and J. L. Wharton in Journal of Cellular Plastics, March/April 1975, pages 87 to 98, U. Knipp in Journal of Cellular Plastics, March/April 1973, pages 76 to 84 and in the Kunststoff-Handbuch, Volume 7, Polyurethane, 2nd Edition, 1983, pages 333 ff.

The reaction mixtures for producing the PU foams can be placed in open molds and free-foamed in the open molds or foamed in closed molds to give moldings.

It has been found to be particularly advantageous to work according to the two-component method and to combine the formative components (b), (d), (e) and, if desired, (c) and (f) in the component (A) and to use the organic polyisocyanates (a), modified polyisocyanates or mixtures of the specified polyisocyanates and, if desired, blowing agent (d) as component (B).

The starting components are usually mixed at from 15 to 80° C., preferably from 25 to 55° C. and introduced into the open mold or, if desired, introduced under increased pressure into the closed mold. Mixing can be carried out mechanically by means of a stirrer or stirring screw or under high pressure using the counter-current injection method. The mold temperature is advantageously from 20 to 120° C., preferably from 30 to 80° C. and in particular from 45 to 60° C. The degrees of compaction for forming the PU integral foam moldings are in the range from 1.4 to 8.3, preferably from 1.8 to 6 and in particular from 2.0 to 2.5.

The amount of reaction mixture introduced into the mold is advantageously such that the resulting PU integral foam moldings have a total density of from 0.06 to 0.6 g/cm$^3$, preferably a total density of from 0.15 to 0.3 g/cm$^3$.

The integral foam moldings produced according to the process of the invention are used, for example, in the automobile industry as safety linings, in the form of sandwich elements for producing consoles for motor vehicles, preferably goods vehicles, and other means of transport, in the form of reinforced moldings as load-bearing elements in vehicle construction, eg. as bodywork parts, in the leisure industry as sun loungers, in the building industry as window frames and in the furniture and machine industry as casing components.

The mold-foamed and free-foamed PU foams and block foams usually have densities of from 0.03 to 0.3 g/cm$^3$, preferably from 0.06 to 0.2 g/cm$^3$, and are used, for example, as insulation material for filling hollow spaces with foam in refrigeration appliances, eg. refrigerators and freezer chests, hot water tanks and heating pipes, in sandwich elements and for insulating parts of buildings, preferably roof coverings, and also for filling hollow spaces in mining. Furthermore, they are suitable as middle layer in composite elements, eg. sun roofs, for vehicles and as upholstery materials.

EXAMPLES

Example 1

| Production of a motor vehicle neck rest | |
|---|---|
| A component: mixture consisting of | |
| 27.59 parts by weight | of a glycerol-initiated polyoxypropylene (86% by weight)-polyoxyethylene(14% by weight) polyol having a hydroxyl number of 28, |
| 64.00 parts by weight | of a 1,2-propylene glycol-initiated poly-oxypropylene(81.5% by weight)-polyoxyethylene(18.5% by weight) glycol having a hydroxyl number of 29, |
| 4.25 parts by weight | of ethylene glycol, |
| 0.2 parts by weight | of a stabilizer based on silicone (Tegostab ® B 8450 from Goldschmidt AG, Essen), |
| 0.6 parts by weight | of a 33% strength by weight solution of triethylenediamine in ethylene glycol, |
| 0.25 parts by weight | of a solution of triethylenediamine in 1,4-butanediol and ethylene glycol in a weight ratio of 25:71:4, |
| 0.01 parts by weight | of a mixture consisting of 50 parts by weight of di-n-octyltin bis(2-ethylhexyl thioglycolate) and 50 parts by weight of mono-n-octyltin tris 2-ethylhexyl thioglycolate) and |
| 3.1 parts by weight | of black paste from ISL-Chemie GmbH, Kürten. |
| Before processing, 6.5 parts by weight of n-pentane were incorporated into 100 parts by weight of A component. | |
| B component: mixture consisting of | |
| 50 parts by weight | of a semiprepolymer containing urethane groups and having an NCO content of 28% by weight; prepared by reacting a mixture of 55 parts by weight of diphenylmethane 4,4'-diisocyanate (MDI) and 45 parts by weight of a mixture of diphenylmethane diisocyanates and polyphenyl-polymethylene polyisocyanates (raw MDI) with 9 parts by weight of a polyoxypropylene glycol having a hydroxyl number of 250 and |
| 50 parts by weight | of a semiprepolymer containing urethane groups and having an NCO content of 23% by weight, prepared by reacting 4,4'-MDI with a mixture of dipropylene glycol and a polyoxypropylene glycol having a hydroxyl number of 250. |

To produce the neck rest, the A and B components were intensively mixed in a weight ratio of 100:33 at 23° C. and the reaction mixture was introduced into a mold heated to 45° C. in such an amount that the molding foamed and cured in the closed mold had a total density of 0.35 g/cm$^3$.

When the reaction mixture was placed in an open beaker and allowed to foam freely therein, the following physical parameters were measured:

Start time [sec]: 20

Rise time [sec]: 65

Bulk density, free-foamed [g/l]: 130

In the following examples, a catalyst mixture consisting of

| | |
|---|---|
| 50 parts by weight | of di-n-octyltin bis(2-ethylhexyl thioglycolate) and |
| 50 parts by weight | of mono-n-octyltin tris(2-ethylhexyl thioglycolate), | also referred to as "1:1 catalyst mixture", is used for producing the PU foams according to the invention.

Example 2

Production of a very flexible motor vehicle neck rest

A component: mixture consisting of

| | |
|---|---|
| 23.6 parts by weight | of a glycerol-initiated polyoxypropylene (86.5% by weight)-polyoxyethylene(13.5% by weight) polyol having a hydroxyl number of 35, |
| 55.40 parts by weight | of a 1,2-propylene glycol-initiated polyoxypropylene(81.5% by weight)-polyoxyethylene(18.5% by weight) glycol having a hydroxyl number of 29, |
| 4.00 parts by weight | of ethylene glycol, |
| 0.9 parts by weight | of a 33% strength by weight solution of triethylenediamine in ethylene glycol, |
| 0.08 parts by weight | of bis(2-N,N-dimethylaminoethyl) ether, |
| 0.3 parts by weight | of sulfated castor oil (additive SM from Bayer AG), |
| 0.02 parts by weight | of 1:1 catalyst mixture, |
| 2.7 parts by weight | of black paste from ISL-Chemie GmbH, Kürten, and |
| 13 parts by weight | of 1,1-dichloro-1-fluoroethane. |

B component: as in Example 1.

To produce the neck rest, the A and B components were intensively mixed in a weight ratio of 100:36 at 23° C. and the reaction mixture was introduced into a mold heated to 50° C. in such an amount that the molding foamed and cured in the closed mold had a total density of 0.3 g/cm³.

When the reaction mixture was placed in an open beaker and allowed to foam freely therein, the following physical parameters were measured:

Start time [sec]: 21
Rise time [sec]: 55
Bulk density, free-foamed [g/l]: 167

Example 3

Production of a bicycle saddle insert

A component: mixture consisting of

| | |
|---|---|
| 99.03 parts by weight | of a glycerol-initiated polyoxypropylene (86% by weight)-polyoxyethylene(14% by weight) polyol having a hydroxyl number of 28, |
| 0.6 parts by weight | of a 33% strength by weight solution of triethylenediamine in dipropylene glycol, |
| 0.02 parts by weight | of 1:1 catalyst mixture and |
| 0.35 parts by weight | of water. |

B component: mixture consisting of

| | |
|---|---|
| 30 parts by weight | of a semiprepolymer containing urethane groups and having an NCO content of 28% by weight, prepared by reacting a mixture of 55 parts by weight of 4,4'-MDI and 45 parts by weight of raw MDI with 9 parts by weight of a polyoxypropylene glycol having a hydroxyl number of 250 and |
| 70 parts by weight | of a semiprepolymer containing urethane groups and having an NCO content of 23% by weight, prepared by reacting 4,4'-MDI with a mixture of dipropylene glycol and a polyoxypropylene glycol having a hydroxyl number of 250. |

To produce the bicycle saddle insert, the A and B components were intensively mixed in a weight ratio of 100:16.0 at 23° C.; the reaction mixture was introduced into a mold heated to 45° C., the mold was closed and the reaction mixture was allowed to foam and cure essentially without compaction.

When the reaction mixture was placed in an open beaker and allowed to foam freely therein, the following physical parameters were measured:

Start time [sec]: 60
Rise time [sec]: 500
Bulk density, free-foamed [g/l]: 420

Example 4

Production of hose nozzles

A component: mixture consisting of

| | |
|---|---|
| 64.89 parts by weight | of a glycerol-initiated polyoxypropylene (86.5% by weight)-polyoxyethylene(13.5% by weight) polyol having a hydroxyl number of 35, |
| 23.00 parts by weight | of a grafted polyether polyol having a hydroxyl number of 28, prepared by free-radical, in situ polymerization from a glycerol-initiated polyoxypropylene-polyoxyethylene polyol as graft base and a mixture of styrene and acrylonitrile in a weight ratio of 3:2 for forming the grafted-on part, |
| 6.8 parts by weight | of 1,4-butanediol, |
| 0.6 parts by weight | of glycerol, |
| 0.9 parts by weight | of triethanolamine, |
| 1.2 parts by weight | of dimethylethanolamine, |
| 0.5 parts by weight | of a 25% strength by weight solution of triethylenediamine in 1,4-butanediol, |
| 0.05 parts by weight | of 1:1 catalyst mixture, |
| 0.16 parts by weight | of water, |
| 0.1 parts by weight | of a stabilizer based on silicone (Tegostab ® B 8450 from Goldschmidt AG, Essen), |
| 1.8 parts by weight | of black paste from ISL-Chemie GmbH, Kürten. |

Prior to processing, 3.5 parts by weight of n-pentane were incorporated, into 100 parts by weight of A component.

B component: mixture consisting of

| | |
|---|---|
| 35 parts by weight | of 4,4'-MDI, |
| 35 parts by weight | of 2,4'-MDI and |
| 30 parts by weight | of raw MDI |

To produce the hose nozzles, the A and B components were intensively mixed in a weight ratio of 100:33.5 at 23° C. and introduced into a mold heated to 50° C. in such an amount that the molding foamed and cured in the closed mold had a total density of 0.45 g/cm³.

When the reaction mixture was placed in an open beaker and allowed to foam freely therein, the following physical parameters were measured:

Start time [sec]: 17
Rise time [sec]: 60
Bulk density, free-foamed [g/l]: 150

Example 5

Production of a foam top for an operating table

A component: mixture consisting of

| | |
|---|---|
| 63.58 parts by weight | of a glycerol-initiated polyoxypropylene (86.5% by weight)-polyoxyethylene(13.5% by weight) polyol having a hydroxyl number of 35, |
| 21.00 parts by weight | of a 1,2-propylene glycol-initiated polyoxypropylene(81.5% by weight)-polyoxyethylene(18.5% by weight) polyol having a hydroxyl number of 29, |
| 7.00 parts by weight | of a grafted polyether polyol having a hydroxyl number of 28, prepared by free-radical, in situ polymerization from a glycerol-initiated polyoxypropylene-polyoxyethylene polyol as graft base and a mixture of styrene and acrylonitrile in a weight ratio of 3:2 for forming the grafted-on part, |
| 4.8 parts by weight | of 1,4-butanediol, |
| 1.2 parts by weight | of a 25% strength by weight solution of triethylenediamine in 1,4-butanediol, |
| 0.05 parts by weight | of 1:1 catalyst mixture, |
| 0.22 parts by weight | of water, |
| 0.15 parts by weight | of a stabilizer based on silicone (Tegostab ® B 8450 from Goldschmidt AG, Essen), |
| 2.0 parts by weight | of black paste from ISL-Chemie GmbH, Kürten. |

Prior to processing, 5.5 parts by weight of cyclopentane were incorporated into 100 parts by weight of A component.

B component: mixture comprising a semiprepolymer containing urethane groups and having an NCO content of 23% by weight, prepared by reacting 4,4'-MDI with a mixture of dipropylene glycol and a polyoxypropylene glycol having a hydroxyl number of 250.

To produce the PU integral foam top, the A and B components were intensively mixed in a weight ratio of 100:36 at 23° C. and the reaction mixture was introduced into a mold heated to 45° C. in such an amount that the molding foamed and cured in the closed mold had a total density of 0.3 g/cm³.

When the reaction mixture was placed in an open beaker and allowed to foam freely therein, the following physical parameters were measured:

Start time [sec]: 20

Rise time [sec]: 40

Bulk density, free-foamed [g/l]: 130

Examples 6/1 to 6/3 and Comparative Examples I/1 to I/3

PU integral foam formulation for producing a motor vehicle steering wheel

A component: mixture consisting of

| | |
|---|---|
| 60.00 parts by weight | of a glycerol-initiated polyoxypropylene (86.5% by weight)-polyoxyethylene(13.5% by weight) polyol having a hydroxyl number of 35, |
| 12.25 parts by weight | of a trimethylolpropane-initiated polyoxypropylene(80% by weight)-polyoxyethylene-(20% by weight) polyol having a hydroxyl number of 26, |
| 10.00 parts by weight | of a grafted polyether polyol having a hydroxy number of 28, prepared by free-radical, in situ polymerization from a glycerol-initiated polyoxypropylene-polyoxyethylene polyol as graft base and a mixture of styrene and acrylonitrile in a weight ratio of 3:2 for forming the grafted-on part, |
| 10.00 parts by weight | of a 1,2-propylene glycol-intitiated polyoxyethylene glycol having a hydroxyl number of 187, |
| 0.5 parts by weight | of glycerol, |
| 6.0 parts by weight | of ethylene glycol, |
| 0.7 parts by weight | of water, |
| 0.1 parts by weight | of dilauryltin dimercaptide and |
| 0.1 parts by weight | of a mixture of di-n-octyltin bis(2-ethylhexyl thioglycolate) and mono-n-octyltin tris(2-ethylhexyl thioglycolate) having the compositions given in Table 1. |

B component: mixture consisting of

| | |
|---|---|
| 50 parts by weight | of a semiprepolymer containing urethane groups and having an NCO content of 23% by weight, prepared by reacting 4,4'-MDI with a mixture of dipropylene glycol and a polyoxypropylene glycol having a hydroxyl number of 250 and |
| 50 parts by weight | of a polyisocyanate mixture containing carbodiimide groups and having an NCO content of 29.5% by weight, prepared by partial carbodiimidization of 4,4'-MDI. |

To produce a molding, the A and B components were intensively mixed in a weight ratio of 100:65.09 at 23° C., the reaction mixture was introduced into a metal mold heated to 45° C. and having internal dimensions of 20.5× 20.5×2 cm and allowed to foam in the closed mold with compaction at a degree of compaction of 3.5. The tabular molding was taken from the mold after 3 minutes and examined for any detachment of the essentially compact surface zone from the cellular core.

When the reaction mixtures were allowed to foam freely in an open beaker, this resulted in PU foams having a free-foamed density of 150 g/l. The start, setting and rise times given in Table 1 were measured here.

TABLE 1

Mixtures of di-n-octyltin bis(2-ethylhexyl thioglycolate), abbreviated as "di", and mono-n-octyltin bis(2-ethylhexyl thioglycolate), abbreviated as "mono", in different weight ratios and the start, setting and rise times measured on free-foamed PU foams

| | Weight ratio di:mono | Start time [sec] | Setting time [sec] | Rise time [sec] | Detachment of the compact surface zone from the foam core |
|---|---|---|---|---|---|
| Examples | | | | | |
| 6/1 | 60:40 | 34 | 50 | 58 | not detectable |
| 6/2 | 50:50 | 34 | 52 | 60 | not detectable |
| 6/3 | 40:60 | 36 | 54 | 62 | not detectable |
| Comparative examples | | | | | |
| I/1 | 94:6 | 25 | 40 | 47 | present to a great extent |
| I/2 | 70:30 | 31 | 49 | 57 | present |
| I/3 | 30:70 | 36 | 55 | 63 | present |

Examples 7/1 to 7/3 and Comparative Examples II/1 to II/3

PU integral foam formulation for producing a motor vehicle steering wheel

A component: mixture consisting of

| | |
|---|---|
| 59.7 parts by weight | of a glycerol-initiated polyoxypropylene (86.5% by weight)-polyoxyethylene(13.5% by weight) polyol having a hydroxyl number of 35, |
| 11.0 parts by weight | of a trimethylolpropane-initiated polyoxypropylene (80% by weight)-polyoxyethylene (20% by weight) polyol having a hydroxyl number of 26, |
| 15.00 parts by weight | of a polyoxyalkylene polyol dispersion having a hydroxyl number of 35, prepared by dispersion at 23° C. for 5 minutes, using a dissolver at 1000 rpm, of a synthetically prepared magnesium aluminum silicate (Transpafill ® from Degussa) as filler in a glycerol-initiated polyoxypropylene (86% by weight)-polyoxyethylene(14% by weight) polyol in a weight ratio of 15:85, |
| 6.0 parts by weight | of a 1,2-propylene glycol-initiated polyoxyethylene glycol having a hydroxyl number of 187, |
| 0.5 parts by weight | of glycerol, |
| 6.5 parts by weight | of ethylene glycol, |
| 0.7 parts by weight | of water, |
| 0.5 parts by weight | of a 33% strength by weight solution of triethylenediamine in dipropylene glycol and |
| 0.1 parts by weight | of a mixture of di-n-octyltin bis(2-ethylhexyl thioglycolate) and mono-n-octyltin tris (2-ethylhexyl thioglycolate) having the compositions given in Table 2. |

B component: as in Example 6.

The moldings were produced using a method similar to that described in Example 6, but the weight ratio of A to B component was 100:66.82.

When the reaction mixtures were allowed to foam freely in a beaker, this gave PU foams having a free-foamed density of 150 g/l. In this foaming process, the start, setting and rise times given in Table 2 were measured.

TABLE 2

Mixtures of di-n-octyltin bis(2-ethylhexyl thioglycolate), abbreviated as "di", and mono-n-octyltin bis(2-ethylhexyl thioglycolate), abbreviated as "mono", in different weight ratios and the start, setting and rise times measured on free-foamed PU foams

| | Weight ratio di:mono | Start time [sec] | Setting time [sec] | Rise time [sec] | Detachment of the compact surface zone from the foam core |
|---|---|---|---|---|---|
| Examples | | | | | |
| 7/1 | 60:40 | 22 | 35 | 45 | not detectable |
| 7/2 | 50:50 | 22 | 38 | 49 | not detectable |
| 7/3 | 40:60 | 24 | 39 | 50 | not detectable |
| Comparative examples | | | | | |
| II/1 | 94:6 | 19 | 28 | 35 | present to a great extent |

TABLE 2-continued

Mixtures of di-n-octyltin bis(2-ethylhexyl thioglycolate), abbreviated as "di", and mono-n-octyltin bis(2-ethylhexyl thioglycolate), abbreviated as "mono", in different weight ratios and the start, setting and rise times measured on free-foamed PU foams

|  | Weight ratio di:mono | Start time [sec] | Setting time [sec] | Rise time [sec] | Detachment of the compact surface zone from the foam core |
|---|---|---|---|---|---|
| II/2 | 70:30 | 21 | 34 | 44 | present |
| II/3 | 30:70 | 26 | 41 | 54 | present |

The Examples 6/1 to 6/3 and 7/1 to 7/3 show that the use of the catalyst mixture consisting of di-n-octyltin bis(2-ethylhexyl thioglycolate) and mono-n-octyltin tris(2-ethylhexyl thioglycolate) in the mixing ratios suitable according to the invention gives PU integral foams which show no detachment of the compact surface zone from the foam core.

Example 8

| Production of a semirigid PU foam | |
|---|---|
| A component: mixture consisting of | |
| 47.50 parts by weight | of a block polyoxypropylene-polyoxyethylene polyol having a hydroxyl number of 30 and a content of terminally bonded ethylene oxide units of 5.9% by weight, based on the weight of the propylene oxide units, obtained by alkoxylation of an initiator molecule mixture of glycerol and water in a weight ratio of 1:0.98, |
| 1.50 parts by weight | of a glycerol-initiated polyoxyethylene (62.5% by weight)-polyoxypropylene (27.5% by weight)-polyoxyethylene(10% by weight) polyol having a hydroxyl number of 42, |
| 41.3 parts by weight | of a glycerol-initiated polyoxypropylene (86% by weight)-polyoxyethylene(14% by weight) polyol having a hydroxyl number of 28, |
| 1.00 parts by weight | of a polyoxypropylene polyol initiated using technical-grade tripropylenetetramine and having a hydroxyl number of 394, |
| 5.00 parts by weight | of a polyoxypropylene glycol initiated using 1,3-(N,N-dimethylamino) propane and having a hydroxyl number of 250, |
| 0.5 parts by weight | of ricinoleic acid (Edenor ® RI 90), |
| 2.2 parts by weight | of water, |
| 1.0 parts by weight | of a sterically hindered amine as antioxidant (Naugard ® 445) and |
| 0.05 parts by weight | of 1:1 catalyst mixture. |
| B component: raw MDI having an NCO content of 31.3% by weight, based on the total weight, and containing 37% by weight of 4,4'-MDI and 2% by weight of 2,4'-MDI, in each case based on the total weight. | |

Backfoaming of a dashboard for a motor vehicle:

For this purpose, use was made of a Hennecke foaming apparatus with an MQ mixing head having a throttle setting of 5, nozzles having a diameter of 1.3 mm for the A component and of 0.8 mm for the B component and an output rating of 223 g/seconds. The shot time was from 4.2 to 5.05 seconds, which corresponds to an output of from 920 g to 1126 g.

For backfoaming the dashboard, the cover film of PVC/ABS was laid into a metal mold heated to from 40 to 43° C., the mold was closed, the A and B components were mixed at 30° C. and a pressure of 200 bar in a weight ratio of 100:41.66, the reaction mixture was injected into the closed mold and allowed to foam therein.

The dashboard obtained was removed from the mold after 3.5 minutes and then kept at 80° C. for 1 hour. No sink marks could be detected. After 24 hours, the molding showed sufficient adhesion between the PU semirigid foam and the PVC/ABS film.

The procedure described enabled 30 void-free dashboards to be produced without problems. The trial was then terminated.

The PU foam had a free-foamed density of 67 g/l and the dashboard had a total weight of 3200 g.

Comparative Example III

The procedure was similar to that described in Example 8, but without using the 1:1 catalyst mixture in the A component.

The PU foam produced had a free-foamed density of 76 g/l and the dashboard had a total weight of 3300 g.

Example 8 and Comparative Example III show that use of the catalyst mixture consisting of di-n-octyltin bis(2-ethylhexyl thioglycolate) and mono-n-octyltin tris(2-ethylhexyl thioglycolate) in the weight ratio according to the invention of 1:1 reduced the total weight of the dashboard by 100 g.

We claim:

1. A process for producing polyurethane foams comprising reacting a) organic polyisocyanates, modified organic polyisocyanates or mixtures of organic and modified organic polyisocyanates with b) at least one relatively high molecular weight compound containing at least two reactive hydrogens, having a functionality of from 2 to 8 and a molecular weight of from 400–8500, and, optionally, c) low molecular weigh chain extenders, crosslinkers or mixtures of chain extenders and crosslinkers in the presence of d) blowing agents e) catalysts and in the presence or absence of f) additives, wherein the catalysts (e) comprise e') from 35 to 65 parts by weight of di-n-octyltin bis (2-ethylhexyl thioglycolate)

e") from 65 to 35 parts by weight of mono-n-octyltin tris(2-ethylhexyl thioglycolate).

2. A process for producing polyurethane integral skin foams comprising reacting a) organic polyisocyanates, modified organic polyisocyanates or mixtures or organic and modified organic polyisocyanates with b) at least one relatively high molecular weight compound containing at least two reactive hydrogens, having a functionality of from 2 to 8 and a molecular weight of from 400–8500, and, optionally, c) low molecular weight chain extenders, crosslinkers or mixtures of chain extenders and crosslinkers in the presence of d) blowing agents, e) catalysts and in the presence or absence of f) additives, in a closed mold with compaction, wherein the catalysts (e) comprise e') from 35 to 65 parts by weight of di-n-octyltin tris(2-ethylhexyl thioglycolate) and e") from 65 to 35 parts by weight of mono-n-octyltin tris(2-ethylhexyl thioglycolate).

3. A process for producing polyurethane semirigid foams comprising reacting a) organic polyisocyanates, modified organic polyisocyanates or mixtures of organic and modified organic polyisocyanates with b) at least one at least polyhydroxyl compound having a molecular weight of from 2000 to 5000 and a functionality of from 2 to 3 and, optionally, c) low molecular weight chain extenders, crosslinkers or mixtures of chain extenders and crosslinkers in the presence of d) blowing agents, e) catalysts and in the presence or absence of f) additives in a closed mold with compaction, wherein the catalysts (e) comprise e') from 35 to 65 parts by weight of di-n-octyltin bis (2-ethylhexyl thioglycolate) and e") from 65 to 35 parts by weight of mono-n-octyltin tris (2-ethylhexyl thioglycolate).

4. A process as claimed in any of claims 1 to 3, wherein tertiary amines, alkali metal or alkaline earth metal salts of monocarboxylic acids having from 1 to 20 carbon atoms or mixtures of tertiary amines and the specified alkali metal or alkaline earth metal salts are used as cocatalysts.

5. A process as claimed in claim 4, wherein the catalyst (e), comprising (e') and (e"), is used in an amount of from 0.005 to 1% by weight, based on the weight of (b) or (b) and (c).

6. A process as claimed in claim 4, wherein the cocatalysts are used in an amount of up to 3% by weight, based on the weight of (b) or (b) and (c).

7. A process for producing polyurethane integral foams as claimed in claim 2, wherein the mold temperature is from 30 to 80° C. and the degree of compaction is from 1.8 to 6.

8. A process for producing polyurethane foams as claimed in claim 1, wherein the blowing agent (d) used is water.

9. A process for producing polyurethane foams as claimed in claim 1, wherein the blowing agents (d) used are alkanes, cycloalkanes or mixtures of alkanes and cycloalkanes having boiling points of from −40° C. to 50° C. under atmospheric pressure.

10. A process producing polyurethane foams as claimed in claim 1, wherein the blowing agents (d) used are mixtures of water and alkanes, cycloalkanes or mixtures of alkanes and cycloalkanes having boiling points of from −40° C. to 50° C. under atmospheric pressure.

11. A process as claimed in claim 1, wherein compound (b) comprises a polyether polyol, polyester polyol, polymer-modified polyether polyol or a mixture thereof.

12. A process as claimed in claim 2, wherein compound (b) comprises a polyether polyol, polyester polyol, polymer-modified polyether polyol or a mixture thereof.

13. A process as claimed in claim 3, wherein compound (b) comprises a polyether polyol, polyester polyol, polymer-modified polyether polyol or a mixture thereof.

* * * * *